(12) United States Patent
Ahmed et al.

(10) Patent No.: US 9,917,510 B2
(45) Date of Patent: Mar. 13, 2018

(54) MULTI-STAGED BUCK CONVERTER WITH EFFICIENT LOW POWER OPERATION

(71) Applicant: DIALOG SEMICONDUCTOR (UK) LIMITED, London (GB)

(72) Inventors: Ershad Ahmed, Campbell, CA (US); Sorin Laurentiu Negru, Campbell, CA (US); Chi-Man Ng, Campbell, CA (US); Alin Gherghescu, Campbell, CA (US)

(73) Assignee: DIALOG SEMICONDUCTOR (UK) LIMITED, London (GB)

( * ) Notice: Subject to any disclaimer, the term of this patent is extended or adjusted under 35 U.S.C. 154(b) by 0 days.

(21) Appl. No.: 15/216,640

(22) Filed: Jul. 21, 2016

(65) Prior Publication Data

US 2018/0026526 A1  Jan. 25, 2018

(51) Int. Cl.
*G05F 1/59* (2006.01)
*H02M 3/07* (2006.01)

(52) U.S. Cl.
CPC .................................. *H02M 3/07* (2013.01)

(58) Field of Classification Search
CPC ........ H02M 3/1584; H02M 2003/1586; H01L 24/49; H01L 24/40; G05F 1/56
USPC ....... 363/59, 60, 65; 327/536–541; 323/272, 323/280, 282–290

See application file for complete search history.

(56) References Cited

U.S. PATENT DOCUMENTS

| | | | |
|---|---|---|---|
| 7,030,683 B2* | 4/2006 | Pan ...................... | H02M 3/073 327/536 |
| 7,382,176 B2* | 6/2008 | Ayres .................... | H02M 3/073 327/536 |
| 7,724,551 B2* | 5/2010 | Yanagida ............... | H02M 3/073 323/266 |
| 7,791,321 B2* | 9/2010 | Xu ....................... | H02M 3/1584 323/262 |
| 7,969,129 B2* | 6/2011 | Kudo ................... | H02M 3/1584 323/266 |
| 9,419,509 B2* | 8/2016 | Jarvinen ............... | H02M 1/084 |
| 2008/0205098 A1* | 8/2008 | Xu ....................... | H02M 3/1584 363/45 |
| 2011/0169471 A1* | 7/2011 | Nagasawa ........... | H02M 3/1584 323/283 |
| 2015/0277460 A1* | 10/2015 | Liu ........................... | H03L 7/06 323/280 |

* cited by examiner

*Primary Examiner* — Rajnikant Patel
(74) *Attorney, Agent, or Firm* — Haynes and Boone, LLP

(57) ABSTRACT

A system and method of increasing the efficiency in multi-stage power converters by providing an open loop charge pump stage which reacts in part based on information from a closed loop multi-phase buck converter stage.

20 Claims, 4 Drawing Sheets

MULTI-STAGED BUCK CONVERTER WITH EFFICIENT LOW POWER OPERATION

TECHNICAL FIELD

This application relates to power converters, and more particularly to circuits and techniques for improving low output load efficiency in staged buck converters.

BACKGROUND

A typical computing power supply for laptops and related devices such as tablets uses a combination of Lithium Ion (Li-Ion) batteries, usually arranged in groups of two cells in series that produces a maximum voltage of approximately 10V. Such a relatively high power supply voltage is unsuitable for modern integrated circuits so mobile personal computers (PCs) conventionally include a buck converter to regulate the battery power supply voltage from the series-connected batteries to an internal power supply voltage such as 1V for powering the integrated circuits within the device.

A single stage multi-phase buck converter would require high voltage components to step down from such a relatively high battery power supply voltage to the relatively low internal power supply voltage. The use of such high voltage components demands substantial die space to achieve suitable drain to source resistance and also leads to higher gate drive losses and voltage-current overlap switching losses for the power switches. Thus, single stage multi-phase buck converters are not very efficient in applications in which the output voltage is substantially stepped down from, for example, around 10V to 1V.

To improve the efficiency, two-stage multi-phase DC/DC power converters have been used. A first stage comprises a step-down switched capacitor (charge pump) stage that converts the input voltage from the batteries into an intermediate charge pump output voltage. A second stage multi-phase buck converter converts the intermediate charge pump output voltage into the regulated internal power supply voltage. But the efficiency of such multi-stage power converters at low output load remains a problem.

Accordingly, there is a need in the art for an improved multi-stage DC/DC power converter with efficient operation at low output loads.

SUMMARY

A high efficiency two-stage DC/DC power converter is provided. A first stage comprises an open-loop switched capacitor DC/DC (charge pump) converter with a pair of interleaved flying capacitors that functions to divide an input voltage into a charge pump output voltage. The second stage comprises a closed-loop multi-phase buck converter that converts the charge pump output voltage into a regulated buck converter output voltage. The first stage steps down the input voltage, thereby allowing the inductive second stage to use lower-voltage switches. A controller controls the switching frequency for the first stage as a function of the phase shedding for the second stage. As the second stage sheds phases in response to a reduced output load, the controller reduces the switching frequency for the first stage proportionally to the phase shedding.

As the output load decreases even further, the multi-phase buck converter sheds phases until it reaches a single-phase operation and eventually enters a discontinuous conduction mode (DCM) of operation. In response to the transition to DCM operation, the controller commands the charge pump to operate with just one of the flying capacitors to further reduce switching losses. As the output load decreases even further, the controller commands the charge pump to enter a pulse-skipping mode of operation to yet further reduce the switching losses. The low load efficiency of the resulting two-stage DC/DC switching power converter is thus advantageously improved as compared to conventional two-stage DC/DC power converters.

DETAILED DESCRIPTION

Figure 1:
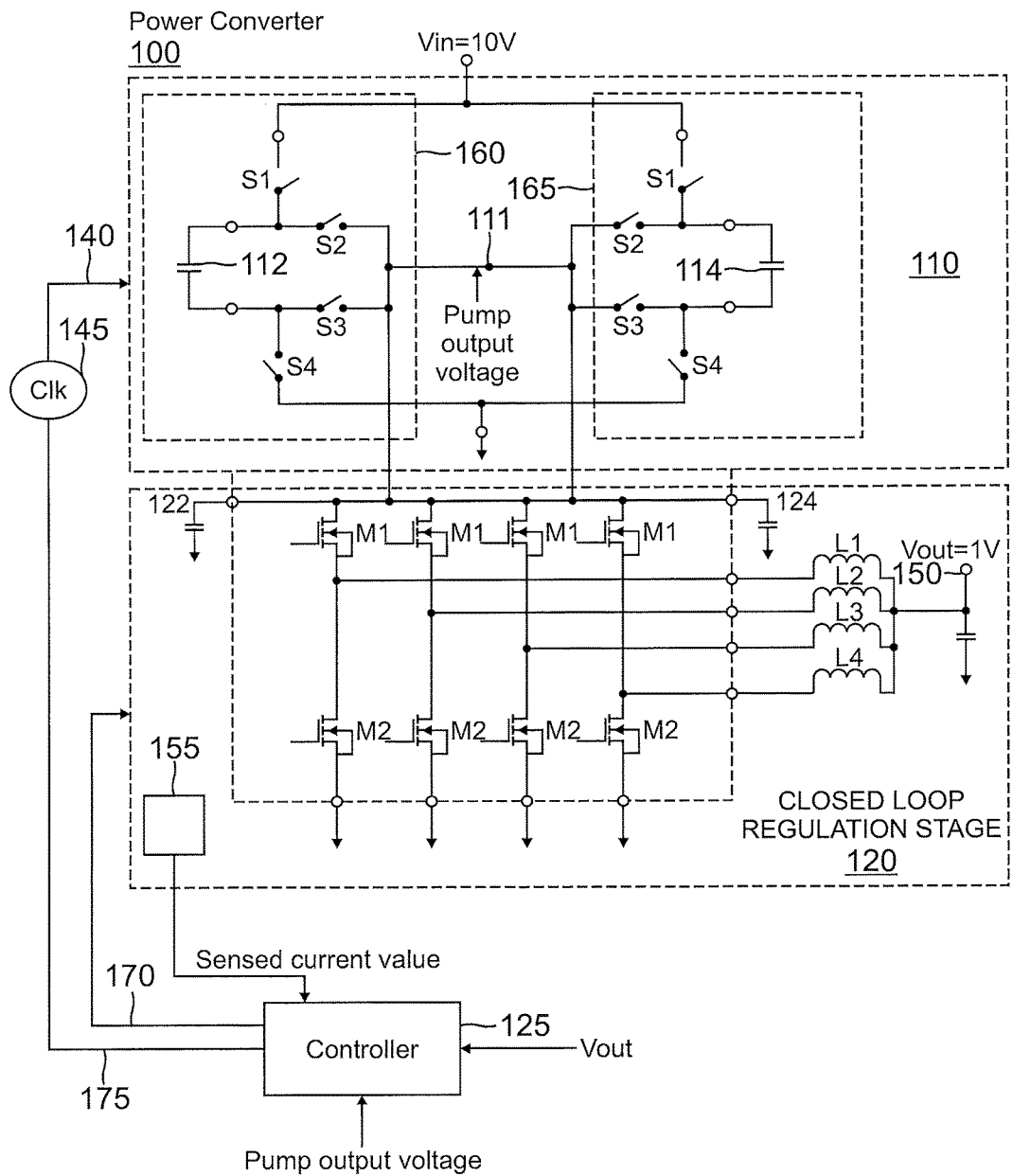
FIG. 1 is a schematic diagram of a two-stage DC/DC power converter in accordance with an aspect of the disclosure.

Turning now to the drawings, an example two-stage DC/DC switching power converter 100 is shown in FIG. 1. A first stage comprises an open-loop charge pump 110 that functions to divide the input voltage Vin (e.g., 10V) into an internal charge pump output voltage on a charge pump output node 111. A second stage multi-phase buck converter 120 receives the charge pump output voltage on charge pump output node 111 and down converts the charge pump output voltage into a buck converter output voltage (Vout) carried on an output node 150. A controller 125 regulates the output voltage for multi-phase buck converter 120 such that it forms a closed-loop regulation stage as compared to the open-loop operation for charge pump 110. Charge pump 110 includes a half-stage 160 and a half-stage 165 that are phased to reduce ripple in the internal output voltage. Half-stage 160 includes a flying capacitor 112 coupled to switches S1, S2, S3, and S4 that are repeated in half-stage 165 for a flying capacitor 114.

The following discussion will assume that both half-stages 160 and 165 function to divide the input voltage by approximately two (voltage splitting). However, it will be appreciated that a division by three configuration may also be implemented such as discussed in U.S. Patent Publication No. 2014/0240034, filed Mar. 1, 2003, the contents of which are incorporated by reference. Since a voltage splitting charge pump configuration is well known in the charge pump arts, the configuration of switches S1, S2, S3, and S4 to divide the input voltage into the charge pump output voltage will not be discussed further herein. Although the configuration of the switches is well-known, such configuration occurs responsive to a clocking from a clock signal 140 as derived from a clock source 145. For example, during one half of a clock cycle for clock signal 140, certain ones of switches S1, S2, S3, and S4 are open and others are closed. The open and off states for the switches then reverses for the remaining half of the clock cycle, and so on.

To provide high efficiency during low load states, controller 125 controls the frequency of clock signal 140 responsive to the phase shedding in multi-phase buck converter 120. Phase shedding in a multi-phase buck converter is well known in the buck converter arts. Each phase corresponds to its own inductor. In multi-phase buck converter 120, there are four phases such that there are four inductors: an inductor L1 for a first phase, an inductor L2 for a second phase, an inductor L3 for a third phase, and an inductor L4 for a fourth phase. Each phase has its own high-side NMOS switch transistor M1 and its own low-side NMOS switch transistor M2. The drain for each high-side switch transistor M1 couples to the charge pump output node 111 of charge pump 110. The inductor for each phase couples between the source of the corresponding high-side switch transistor M1 and output node 150. In each phase, the drain of each low-side switch transistor M2 couples to the source of the corresponding high-side switch transistor M1. The source of each low-side switch transistor M2 couples to ground.

Phase-shedding for a four-phase buck converter such as multi-phase buck converter 120 is considerably simpler to implement if the first phase reduction from operating all four phases drops to two phases. To implement the phase shedding, buck converter 120 includes a loss-less current sensing circuit 155 to sense the output current for buck converter 120 driven out over output node 150. Such loss-less current sensing is well-known in the buck converter arts and may be implemented in numerous ways including: a) using the series resistance for either the high or low-side switches and their drain-to-source voltages, b) providing a sense transistor in a current mirror configuration with either the high or low-side switches, c) a matched filter approach, and so on. In that regard, the output current needed to drive a modern laptop or portable computing device such as a tablet may be quite large (tens of amps). The insertion of a sense resistor directly into the output path over output node 150 would thus be too inefficient. Since loss-less current sensing in multi-phase buck converters is well-known, the operation of current sensing circuit 155 to sense the output current will not be discussed further herein. Similarly, the operation of the high-side and low-side switch transistors M1 and M2 is also well known in the multi-phase buck converter arts such that their on and off configuration when a particular phase is active will also not be discussed further herein. Each phase corresponds to given inductor (one of inductors L1 through L4) and the corresponding pair of high-side and low-side switch transistors M1 and M2. For brevity, each phase will also be denoted by its corresponding inductor such that there are four phases L1 through L4 in multi-phase buck converter 120.

Regardless of the particular implementation for current sensing circuit 155, it provides a sensed value of the output current from buck converter 120 to controller 125. Based upon the magnitude of the output current, controller 125 controls the phase shedding through a phase-shedding command 170. At relatively high values for the output current, controller 125 controls multi-phase buck converter 120 to use all of its phases. It will be appreciated that the number of phases for multi-phase buck converter 120 may be varied from four in alternative embodiments. In a four-phase embodiment such as shown for multi-phase buck converter 120, it reduces complexity considerably to only have three phase shedding configurations: all four phases L1 through L4 being active, just two phases such as L1 and L2 being active, or only one phase being active such as phase L1. However, it will be appreciated that the phase shedding may be phase-by-phase in alternative embodiments. At relatively high levels for the output current, controller 125 drives phase-shedding command 170 such that all four phases are active. As the output current drops below a first phase threshold, controller 125 drives phase-shedding command 170 such that only two phases are active. Similarly, as the output current drops below a second phase threshold that is lower than the first phase threshold, controller 125 drives phase-shedding command 170 such that only one phase is active.

To minimize the switching losses in charge pump 120, controller 125 controls the switching (clocking) frequency for clock signal 140 proportionally to the phase shedding. During a full-power mode when all four phases are active, the clock frequency 140 has a maximum value such as 1 MHz. In contrast, the switching frequency for buck converter 120 is higher such as 2 MHz. Should the phase-shedding reduce to just two phases, controller 125 controls clock source 145 with a control signal 175 to reduce the frequency of clock signal 140 by two to be proportional to the phase shedding. In alternative embodiments, the proportionality need not be linear but the clocking of charge pump 110 would be reduced by some factor in response to the phase shedding from four phases to two. The following discussion will assume without loss of generality that the proportionality between clock signal 140 and the phase shedding is linear. As the output current reduces yet even further as detected by current sensing circuit 155, controller 125 reduces the phases from two to one while reducing the frequency of clock signal 140 by two again. Should the high power frequency for clock signal be 1 MHz, it would thus be reduced to 500 KHz for a two-phase operation and be reduced to 250 KHz for a one-phase operation.

As the output load reduces even further, controller 125 will eventually sense that the one phase operation has entered DCM operation. To protect against noise, such a detection may require a certain number of clock cycles for the one-phase operation to all result in zero current on the corresponding inductor. For example, controller 125 may sense a DCM operation after thirty-two clock cycles of single phase operation have all resulted in the inductor current falling to zero. In response to the DCM operation detection, controller 125 commands charge pump 110 to operate with only one of half stages 160 and 165. The flying capacitor for the inactive stage is placed in parallel with a pair of input capacitors 122 and 124 for multi-phase buck converter 120.

At low output load states, the current sensing by current sensing circuit 155 become more and more noisy and unreliable. Having entered DCM operation, controller 125 thus senses the charge pump output voltage from charge pump 110 to obtain a measure of the output load during such low-load operation. Note that there are resistive losses in charge pump 110 such the output voltage division is not an exactly by a factor of two. Instead, the charge pump output voltage from charge pump 110 equals Vin/2−Re*Iout, where Re is the equivalent series resistance for charge pump 110 and Iout is its output current. Given this relationship between the charge pump output voltage and the charge pump output current, controller 125 may be configured to monitor whether the charge pump output current has dropped to some low level (e.g., 0.25 A) such that a pulse skipping mode in charge pump 110 should be triggered. To avoid problems from noise, the detection may be done with hysteresis such that pulse skipping is triggered by the output current dropping below a minimum value and is cancelled in response to the output current exceeding a maximum value. The charge pump output voltage may be used as a proxy for these charge pump output current values due to the ohmic relationship discussed above. Thus, the high current and low current thresholds are actually voltage thresholds for the charge pump output voltage. The high voltage threshold may be made deliberately lower than the actual charge pump output voltage that would be expected for some arbitrarily low charge pump output current such as 0.25 A. For example, the high voltage threshold may correspond to a charge pump output current of 0.3 A. In that case, the charge pump output voltage from charge pump 110 would be Vin/2−Re*(0.3 A). In this fashion, one can ensure that the charge pump output voltage will exceed the maximum output voltage limit once the charge pump output current drops below 0.25 A.

Figure 2:
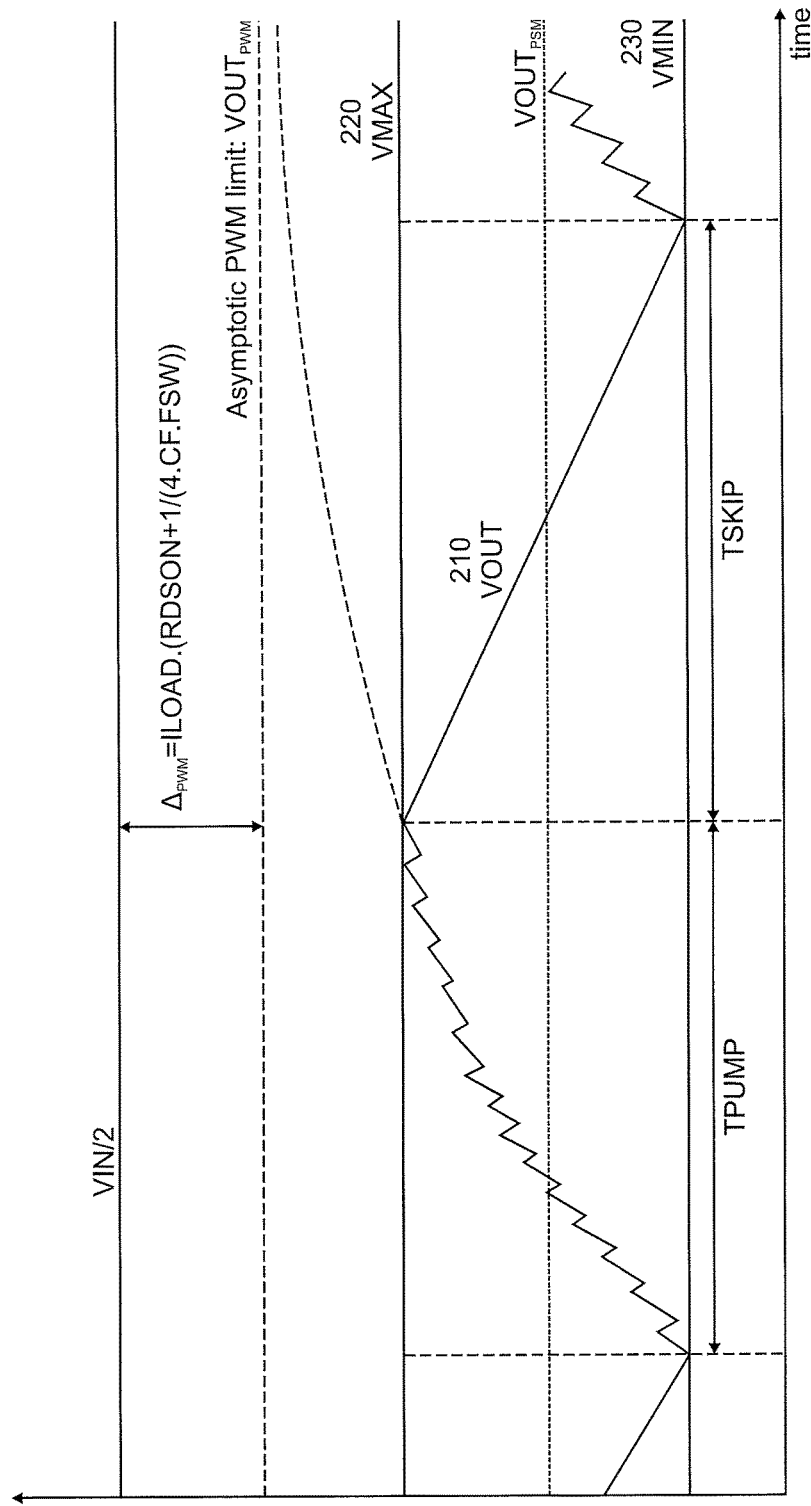
FIG. 2 shows some operational waveforms for the power converter of FIG. 1.

The resulting pulse skipping within charge pump 110 is shown in FIG. 2. The charge pump output voltage is represented by the Vout 210 waveform. When Vout 210 reaches a minimum voltage threshold 230, which is arbitrarily lower than a maximum voltage threshold 220, charge pump 110 is clocked according to clock signal 140. Vout 210 will thus rise due to this resulting charge pumping during a period TPUMP until it reaches maximum voltage threshold 220, whereupon pulses are skipped during a period TSKIP. This period continues until Vout 210 crosses minimum voltage threshold 230, whereupon charge pump cycling resumes.

Figure 3:
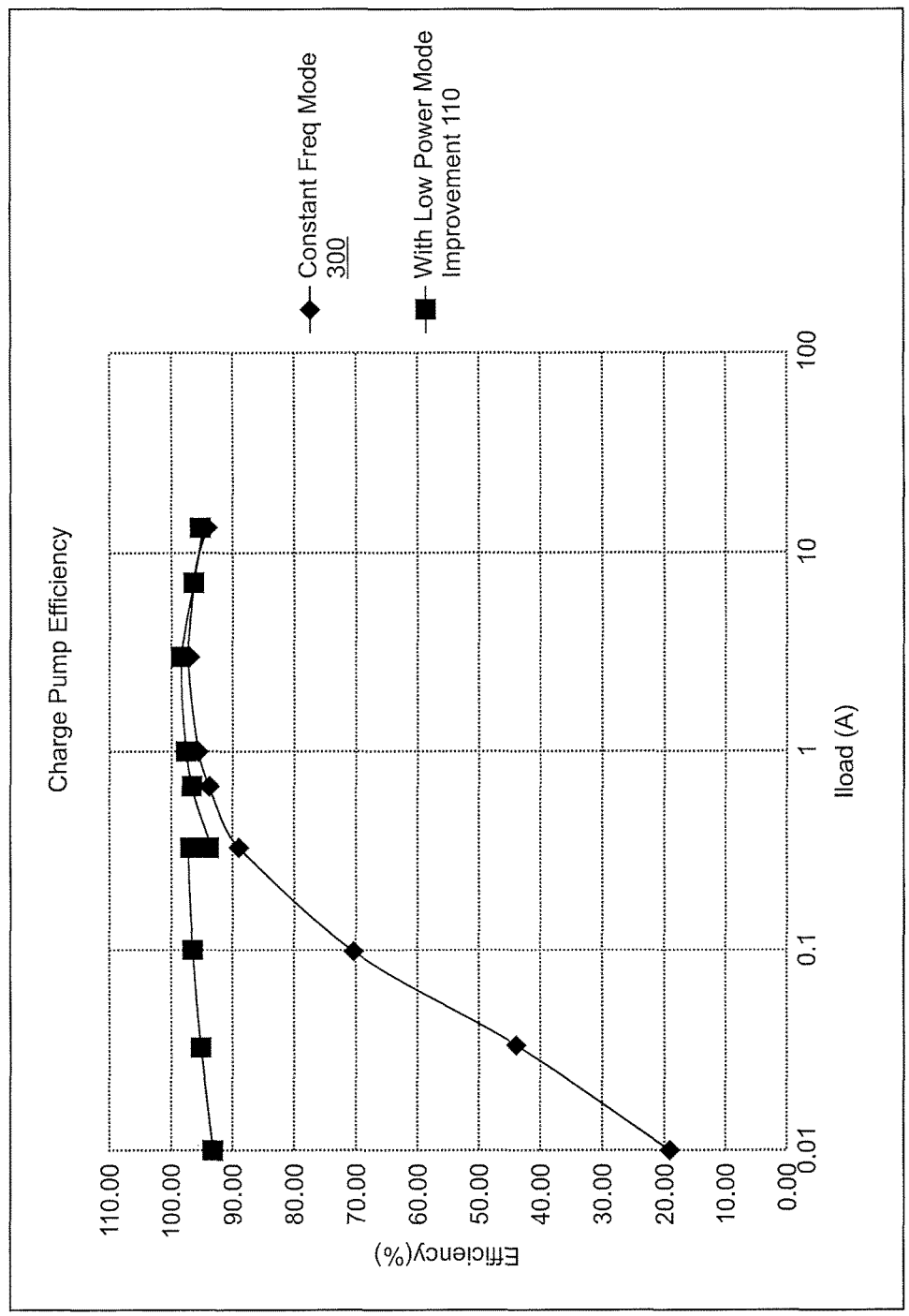
FIG. 3 illustrates the efficiency of the charge pump stage in the power converter of FIG. 1 as compared to a conventional charge pump stage as a function of the output current.

The resulting proportionality between the frequency of clock signal 140 and the phase shedding as the load is reduced, the reduction to just one flying capacitor stage during DCM operation for light loads, and the pulse skipping for exceptionally light loads provides significant efficiency advantages over a conventional two-stage DC/DC converter formed by an open-loop voltage splitting charge pump and a closed-loop multi-phase buck converter. For example, FIG. 3 provides a comparison of the efficiency for charge pump 110 with the low output load modifications described herein versus a conventional charge pump that utilizes a constant frequency mode 300 for its charge pump without any reduction to one flying capacitor operation or pulse skipping. As shown in FIG. 3, the charge pump efficiency gains provided by the techniques and circuits described herein can be substantial. For example, consider the efficiency as the output load (ILOAD) as determined by the buck converter output current drops below 1 A. In particular, charge pump 110 provides a charge pump efficiency of over 90% at an output load of 0.01 A. In sharp contrast, conventional system 300, which remains in constant frequency mode, provides an efficiency reduced to near 20% at the same output load. Such efficiency savings are critical in that it is conventional for a tablet or laptop to go into a standby mode of operation for extended periods of time. The battery life for such devices is thus greatly enhanced by the efficiency gains shown for two-stage DC/DC switching power converter 100.

Figure 4:
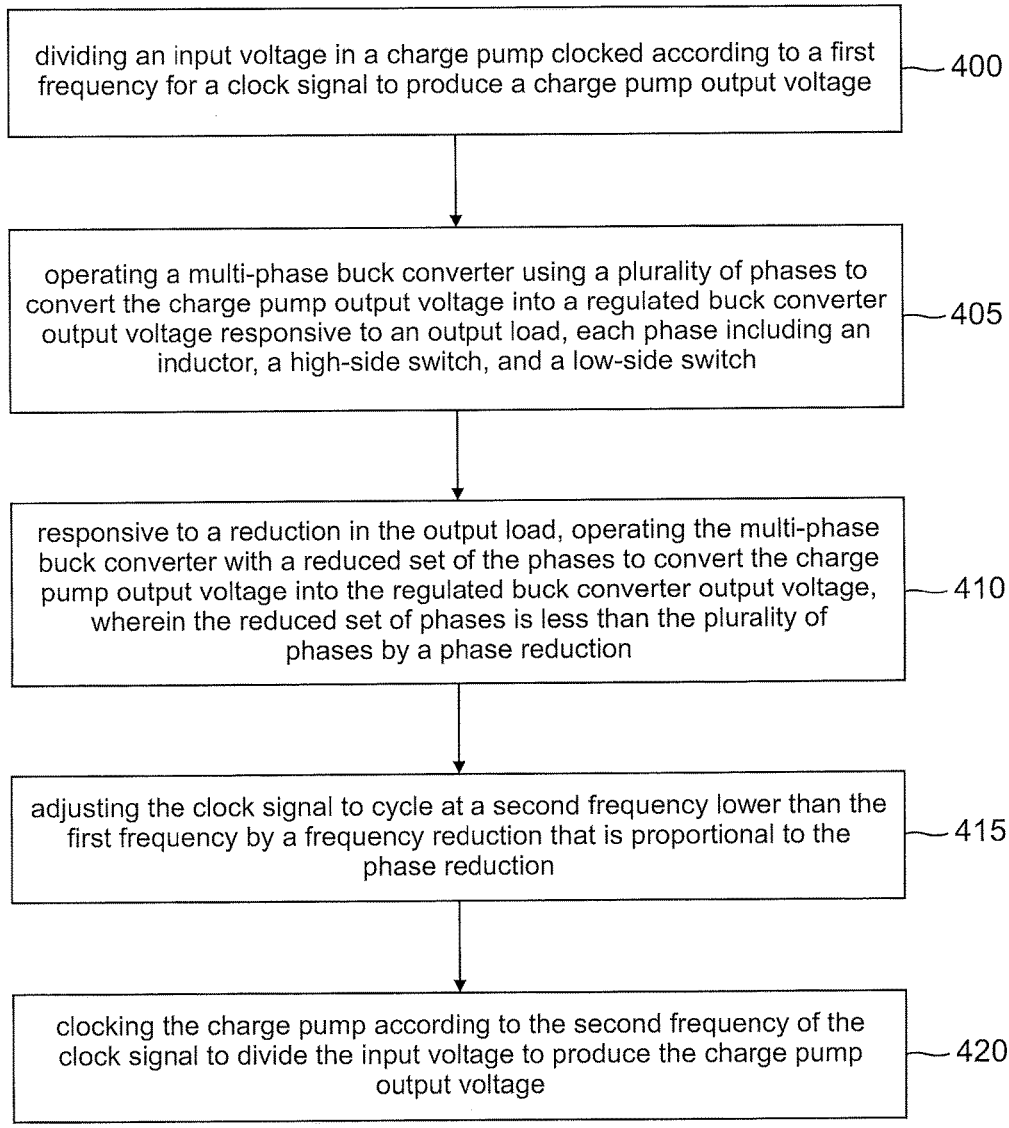
FIG. 4 is a flowchart for an example method of operation for a two-stage DC/DC power converter in accordance with an aspect of the disclosure.

A method of operation for two-stage DC/DC switching power converter 100 will now be discussed with regard to the flowchart of FIG. 4. The method includes an act 400 of dividing an input voltage in a charge pump clocked according to a first frequency for a clock signal to produce a charge pump output voltage. The operation of charge pump 110 while clocked at the maximum clocking rate is an example of act 400. The method further includes an act 405 of operating a multi-phase buck converter using a plurality of phases to convert the charge pump output voltage into a regulated buck converter output voltage responsive to an output load, each phase including an inductor, a high-side switch, and a low-side switch. The operation of multi-phase buck converter 120 with all four phases is an example of act 405. In addition, the method includes an act 410 of, responsive to a reduction in the output load, operating the multi-phase buck converter with a reduced set of the phases to convert the charge pump output voltage into the regulated buck converter output voltage, wherein the reduced set of phases is less than the plurality of phases by a phase reduction. Operation of multi-phase buck converter 120 with just two phases or just one phase is an example of act 410. The method further includes an act 415 of adjusting the clock signal to cycle at a second frequency lower than the first frequency by a frequency reduction that is proportional to the phase reduction. The control by controller 125 through control signal 175 to proportionally reduce the clocking frequency for clock source 145 is an example of act 415. Finally, the method includes an act 420 of clocking the charge pump according to the second frequency of the clock signal to divide the input voltage to produce the charge pump output voltage. Operation of charge pump 110 according to a reduced clocking frequency for clock signal 140 is an example of act 420.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A method of operating a two-staged DC/DC power converter comprising:
    dividing an input voltage in a charge pump clocked according to a first frequency for a clock signal to produce a charge pump output voltage;
    while the charge pump is clocked according to the first frequency, operating a multi-phase buck converter using each phase in a plurality of phases to convert the charge pump output voltage into a regulated buck converter output voltage responsive to an output load, each phase including an inductor, a high-side switch, and a low-side switch;
    adjusting the clock signal to cycle at a second frequency lower than the first frequency;
    clocking the charge pump according to the second frequency of the clock signal to divide the input voltage to produce the charge pump output voltage; and
    while the charge pump is clocked according to the second frequency, operating the multi-phase buck converter with a reduced set of the phases to convert the charge pump output voltage into the regulated buck converter output voltage, wherein the reduced set of phases is less than the plurality of phases by a phase reduction, and wherein the second frequency is lower than the first frequency by a frequency reduction that is proportional to the phase reduction.

2. The method of claim 1, wherein operating the multi-phase buck converter using each phase in the plurality of phases comprises operating the multi-phase buck converter with four phases.

3. The method of claim 1, wherein the frequency reduction is linearly proportional to the phase reduction.

4. The method of claim 3, wherein the phase reduction is a reduction of two phases, and wherein the second frequency is one-half of the first frequency.

5. The method of claim 3, wherein the phase reduction is a reduction from four phases to one phase, and wherein the second frequency is one-fourth of the first frequency.

6. The method of claim 1, wherein the frequency reduction is non-linearly proportional to the phase reduction.

7. The method of claim 1, wherein the dividing the input voltage in the charge pump comprises substantially dividing the input voltage by two.

8. The method of claim 1, wherein the dividing the input voltage in the charge pump comprises substantially dividing the input voltage by three.

9. The method of claim 1, wherein the charge pump includes two stages, each having a flying capacitor, and wherein both the dividing of the input voltage in the charge pump clocked according to the first frequency and the clocking of the charge pump according to the second frequency of the clock signal to divide the input voltage both comprise operating the charge pump with both stages, the method further comprising:
dividing the input voltage in the charge pump using just one of the stages responsive to a determination that the multi-phase buck converter has entered a discontinuous conduction mode of operation.

10. The method of claim 9, further comprising:
ceasing the clocking of the charge pump responsive to the charge pump output voltage exceeding a high voltage threshold while the charge pump operates using just one stage; and
resuming the clocking of the charge pump responsive to the charge pump output voltage being less than a low voltage threshold, wherein the low voltage threshold is less than the high voltage threshold.

11. A two-stage DC/DC power converter, comprising:
a charge pump configured to divide in input voltage into a charge pump output voltage responsive to clock signal;
a multi-phase buck converter having a plurality of phases, each phase including an inductor, a high-side switch, and a low-side switch; and
a controller configured to command the multi-phase buck converter to use each phase in the plurality of phases to convert the charge pump output voltage into a regulated buck converter output voltage while the charge pump is clocked according to a first frequency, wherein the controller is further configured to command the multi-phase buck converter to use a reduced set of the phases to convert the charge pump output voltage into the regulated buck converter output voltage while the charge pump is clocked according to a second frequency that is lower than the first frequency by a frequency reduction, and wherein the reduced set of phases is less than the plurality of phases by a phase reduction, and wherein the frequency reduction is proportional to the phase reduction.

12. The two-stage DC/DC power converter of claim 11, wherein the plurality of phases is a plurality of four phases, and wherein the phase reduction is two phases, and wherein the second frequency is one-half of the first frequency.

13. The two-stage DC/DC power converter of claim 11, wherein the plurality of phases is a plurality of four phases, and wherein the phase reduction is three phases, and wherein the second frequency is one-fourth of the first frequency.

14. The two-stage DC/DC power converter of claim 11, wherein the charge pump is configured to divide the input voltage substantially by two to produce the charge pump output voltage.

15. The two-stage DC/DC power converter of claim 14, wherein the input voltage substantially equals 10 volts, and wherein the charge pump output voltage substantially equals 5 volts.

16. The two-stage DC/DC power converter of claim 11, wherein each high-side switch and each low-side switch comprises an NMOS transistor.

17. The two-stage DC/DC power converter of claim 11, wherein the charge pump comprises two stages, each stage having a flying capacitor, and wherein the controller is further configured to control the charge pump to use just one stage responsive to a determination that the multi-phase buck converter has entered a discontinuous conduction mode of operation.

18. The two-stage DC/DC power converter of claim 11, wherein the controller is further configured to control the one stage of the charge pump to skip pulses responsive to the charge pump output voltage exceeding a high voltage threshold.

19. The two-stage DC/DC power converter of claim 18, wherein the controller is further configured to control the one stage of the charge pump to resume pulsing responsive to the charge pump output voltage dropping below a low voltage threshold that is less than the high voltage threshold.

20. The two-stage DC/DC power converter of claim 11, wherein the charge pump is an open loop charge pump.

* * * * *